United States Patent Office 3,041,716
Patented July 3, 1962

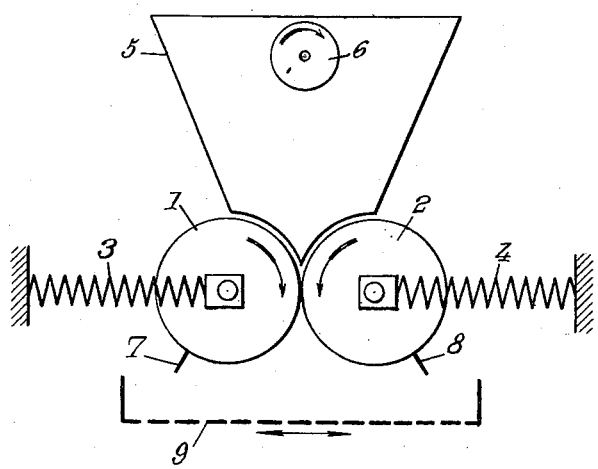

3,041,716
METHOD OF TREATING METALLIC POWDERS
Jean Hérenguel, Versailles, France, assignor to Commissariat a l'Energie Atomique, State Administration, Paris, France
Filed Jan. 17, 1957, Ser. No. 634,710
Claims priority, application France Jan. 18, 1956
1 Claim. (Cl. 29—420.5)

The present invention relates to methods of treating metallic powders, and in particular fine powders, that is to say powders made of particles at least one of the dimensions of which is lower than 10 microns, said particles being in particular of lamellar or flaky form.

The chief object of the present invention is to improve said powders in order to facilitate their subsequent treatment, in particular for sintering.

The essential feature of the present invention consists in subjecting such a metallic powder to a compression capable of deforming at least some of the particles thereof so as to produce between each of the last mentioned particles and at least one adjoining particle a cold welding bond, whereby a "densified" powder, made of larger particles, is obtained. To obtain this result, according to the present invention, a continuous stream of the powder to be treated is passed between two mechanical elements the cooperating surfaces of which, pressed against each other, are moving at slightly different respective speeds.

Such a method does not require any special heating, or any lubrication and it dispenses with the necessity of complying with particular conditions concerning the atmosphere which surrounds the powder, the dimensions of its particles, or the nature and importance of the superficial film which may coat said particles.

As a rule, metallic particles are capable of welding together, merely by compression, if no superficial film is covering them; but for particles covered with a superficial film, a mere compression produces only an agglomeration.

It has been found that, according to the present invention, the strength of this agglomeration can be increased by a deformation. This deformation produces local breakings of the superficial films and corresponding bonds of the cold welding type between the particles. The sintering mechanism proper is thus started.

The importance of the deformation, that is to say of the expansion of the surfaces of every particle has a decisive influence upon the possibility of subsequent transformation of the product, and also upon its properties. As a matter of fact welding between the particles, or sintering, is started in the rough material prior to any compression, sintering or deformation on the scale of the pieces to be obtained. With a rough material which has thus been pre-welded, the facility of subsequent deformation of this material by extrusion, rolling, or the like, in the hot or in the cold state, is increased.

A preferred embodiment of the present invention will be hereinafter described with reference to the accompanying drawing, given merely by way of example and in which:

The only FIGURE diagrammatically shows an apparatus for carrying out the method according to this invention.

In this apparatus, two steel cylinders 1 and 2 are disposed with their axes parallel to each other and located in the same horizontal plane. They are pressed against each other by means of springs such as 3 and 4 respectively. A hopper 5 contains the powder to be densified, fed by means of a distributing device 6. Scrapers 7 and 8 are provided on the surface of cylinders 1 and 2 respectively so that said surface remains geometrically unchanged. The densified product drops on a vibrating sieve 9, of suitable meshing.

In order to improve the efficiency of the apparatus, cylinders 1 and 2 may be replaced by bodies of revolution having surfaces the intersection of which with an axial plane would no longer be rectilinear but would have the shape of a succession of teeth or waves.

The sieve 9 which receives the densified product is not absolutely necessary. It may serve to separate the powder which, for some reason, has not been densified, or in a general manner the particles, either densified or not, which are considered as too small.

Adjustment of the deformation of the particles of raw material is effected by acting simultaneously upon the pressure with which the cylinders are pressed against each other (that is to say upon the strength of springs 3 and 4) and upon the value of the relative movement of the contacting parts of said cylinders.

The agglomerates may subsequently be subjected to a slight crushing, possibly followed by a passage through a sieve, non-agglomerated powder being possibly added to said agglomerated particles in a proportion ranging from 0 to 60%, so as to fill up the empty spaces between the grains and to facilitate final compression and densification.

By way of example, the following results have been obtained with an apparatus of the kind illustrated by the drawing.

EXAMPLE I

The cylinders 1 and 2 have an average diameter of 74 mm. and a length of 100 mm. Their section by an axial plane is a succession of rounded portions having a radius of 30 mm., with a pitch of 11 mm. Their speed of rotation is 24 revolutions per minute for one of them and 26 revolutions for the other. Springs 3 and 4 exert an effort of about 200 kgs.

If the apparatus is fed by constantly filling the hopper with a powder of lamellar aluminum the particles of which have a thickness of 2.5 microns, said aluminum being oxidized (with a thickness of the oxide film equal to 0.05 micron), the apparent density of the powder being 0.43 before densification, I obtain, according to the invention, about 1 kg. per hour of a product the apparent density of which ranges from 0.75 to 1. This product is a mixture of scales some millimeters long and some tenths of a millimeter thick, with finer particles. Such a product may be broken by crushing in the dry state for a very short time (for instance half an hour) in a ball crushing mill containing a charge of balls equal to one half of the normal charge. I thus obtain a densified product having an apparent density of about 1, made of particles the lowest dimensions of which are 600 microns. Micrography shows that the thickness of the flakes is close to 2 microns. The percentage of alumina has not changed during these operations.

With this lamellar powder of 2.5 microns, oxidized with a film of alumina of 0.05 micron, I prepared sintered bars by the known method including a compression in the cold state, a compression in the hot state, then a drawing (in a press, at 600° C., from 68 to 15 mm. of diameter), $a_1$ with the non-densified powder (apparent density: 0.45);

$b_1$ with the powder densified according to the method of the present invention, mixed with 50% of non-densified powder (apparent density of the mixture: 0.8, that is to say nearly twice that of powder $a_1$, so that, for the same weight, the material $b_1$ occupies a volume which is about one-half of that of powder $a_1$).

The properties of these bars are as follows:

*Mechanical Properties at 20° C.*

| Properties | Material $a_1$ | Material $b_1$ |
|---|---|---|
| Breaking load in kg./sq.mm | 32.5 | 33.5 |
| Elastic limit in kg./sq.mm | 26.5 | 27 |
| Elongation on 67S | 6 | 5 |
| Brinell hardness—Ball 2.5 mm.; Load 31.250 kg | 99 | 100 |

*Mechanical Properties in the Hot State*

Stress in kg./sq. mm. admissible at 300° C. to obtain an elongation lower than 0.1% after 100 hours:

| Material $a_1$ | Material $b_1$ |
|---|---|
| 9.35 | 9.50 |

EXAMPLE II

With the same apparatus as in Example I, but with a presure of 100 kgs. applied to rollers 1 and 2 toward each other, and a lamellar aluminum powder of a thickness of 4 microns, oxidized (thickness of the oxide film 0.2 micron), having an apparent density of 0.5 before densification, I obtain, according to the invention, about 10 kgs. per hour of the product in the form of large scales from 2 to 10 mm. long and from 0.1 to 1 mm. thick, with finer particles. Such a product, crushed in the dry state for 15 minutes in a ball crushing mill (with a charge equal to one-half of the normal charge) gives, after passing through a sieve such that the interval between meshes is 500 microns, a granular powder having a density of about 0.8. Micrography shows that the thickness of the particles is 3.5 microns. The percentage of alumina is not changed during these operations.

With the non-densified raw material which will be designated $a_2$, then with the product obtained after the operation above described which will be designated $b_2$, I prepared bars having a rectangular section of 16 x 45 sq. mm. by the known method involving compression in the cold state, compression in the hot state, then extruding (in a press, from 68 mm. of diameter to 16 x 45 sq. mm. of section). I obtained the following results.

With the raw material $a_2$, the rate of welding was insufficient to permit of obtaining a bar without cracks, especially at the angles, whatever be the conditions of extrusion (temperature, speed, shape of the cold drawing apparatus and lubrication). With the material $b_2$ on the contrary, it is possible to obtain at 550° C. bars having a surface without cracks, even at the angles.

The mechanical properties are substantially the same for the bars obtained with $a_2$ and with $b_2$, in the hot and cold state.

Of course, the above indications have been given merely by way of example and may be departed from while remaining within the scope of the invention. For instance, the compression of the raw material may be made between a rotating cylinder applied with a given force against a surface having a relative movement with respect to the axis of this cylinder. The cylinders may be ribbed in a direction parallel to the axis with complementary outlines, scrapers being provided which have a reciprocating movement parallel to the axis.

What I claim is:

In the process of manufacturing aluminum bars from aluminum powder consisting of very small flaky superficially oxidized particles of a size of less than 10 microns, the steps of compacting said aluminum powder between rolls rotating at slightly different speeds under a pressure sufficient to break the superficial oxide film of the aluminum particles, thereby facilitating the cold bonding of said particles and producing elongated particles of aluminum, crushing said elongated particles to smaller particles the shortest length of which is 600 microns, compressing said compacted and crushed particles first in the cold state, compressing said cold-compressed particles in the hot state, and finally extruding said particles to thereby produce bars having a surface without cracks even at the angles.

References Cited in the file of this patent

UNITED STATES PATENTS

| | | |
|---|---|---|
| Re. 21,390 | Grote | Mar. 12, 1940 |
| 2,032,271 | Enghauser | Feb. 25, 1936 |
| 2,178,529 | Calkins | Oct. 31, 1939 |
| 2,212,481 | Sendzimir | Aug. 20, 1940 |
| 2,289,787 | Kaschki et al. | July 14, 1942 |
| 2,302,980 | Stern | Nov. 24, 1942 |
| 2,341,732 | Marvin | Feb. 15, 1944 |
| 2,391,752 | Stern | Dec. 25, 1945 |
| 2,463,680 | Corrigan | Mar. 8, 1949 |
| 2,485,128 | Adams | Oct. 18, 1949 |
| 2,573,639 | Coler | Oct. 30, 1951 |
| 2,689,398 | Gaut et al. | Sept. 21, 1954 |
| 2,717,419 | Dickey | Sept. 13, 1955 |
| 2,729,855 | Titus et al. | Jan. 10, 1956 |
| 2,832,097 | Ehle | Apr. 29, 1958 |